(12) United States Patent
Machay

(10) Patent No.: US 11,498,555 B2
(45) Date of Patent: Nov. 15, 2022

(54) ANTI-COLLISION SYSTEM FOR A TILTABLE TRUCK CAB, AND RELATED DEVICES, COMPONENTS, AND METHODS

(71) Applicant: Volvo Truck Corporation, Gothenburg (SE)

(72) Inventor: Victor Machay, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 258 days.

(21) Appl. No.: 16/470,696

(22) PCT Filed: Dec. 23, 2016

(86) PCT No.: PCT/BR2016/050346
§ 371 (c)(1),
(2) Date: Jun. 18, 2019

(87) PCT Pub. No.: WO2018/112568
PCT Pub. Date: Jun. 28, 2018

(65) Prior Publication Data
US 2020/0086865 A1   Mar. 19, 2020

(51) Int. Cl.
*B60W 30/095* (2012.01)
*B60R 21/38* (2011.01)
(Continued)

(52) U.S. Cl.
CPC ......... *B60W 30/0956* (2013.01); *B60R 21/38* (2013.01); *B60W 30/085* (2013.01); *B62D 33/063* (2013.01); *B60W 2554/00* (2020.02)

(58) Field of Classification Search
None
See application file for complete search history.

(56) References Cited

U.S. PATENT DOCUMENTS 5,389,912 A    2/1995   Arvin
5,710,553 A    1/1998   Soares
(Continued)

FOREIGN PATENT DOCUMENTS

CN    101228063 A    7/2008
CN    103261708 A    8/2013
(Continued)

OTHER PUBLICATIONS

International Search Report and Written Opinion for International Patent Application No. PCT/BR2016/050346, dated Sep. 5, 2017, 9 pages.
(Continued)

*Primary Examiner* — Maceeh Anwari
*Assistant Examiner* — Aarron E Santos
(74) *Attorney, Agent, or Firm* — Withrow & Terranova, PLLC

(57) ABSTRACT

An anti-collision system includes a truck cab defining a truck cab volume and a sensor positioned with respect to the truck cab. The truck cab is rotatable with respect to the truck chassis along a rotation path to define a truck cab rotation volume. The truck cab volume is entirely within the truck cab rotation volume along the entire rotation path, i.e., the truck cab rotation volume encompasses the truck cab volume at every position of the truck cab volume along the rotation path. The sensor has a field of view (FOV) that overlaps a portion of the truck cab rotation volume to detect an obstruction in the FOV that is within the truck cab rotation volume. The sensor may also cause the system to provide an alert or control rotation of the truck cab in response to detecting the obstruction.

22 Claims, 7 Drawing Sheets

(51) Int. Cl.
    *B60W 30/085*   (2012.01)
    *B62D 33/063*   (2006.01)

(56) References Cited

U.S. PATENT DOCUMENTS

| | | | |
|---|---|---|---|
| 2004/0040771 A1* | 3/2004 | Ploucha | E05F 15/43 180/271 |
| 2013/0222592 A1* | 8/2013 | Gieseke | G08G 1/096708 348/148 |
| 2016/0291134 A1 | 10/2016 | Droz et al. | |

FOREIGN PATENT DOCUMENTS

| | | | |
|---|---|---|---|
| CN | 103827942 A | | 5/2014 |
| CN | 204264127 U | | 4/2015 |
| JP | S5935278 | * | 8/1982 |
| JP | S5868377 U | | 5/1983 |
| JP | S5935278 U | * | 3/1984 |
| JP | S5935278 U | | 3/1984 |
| KR | 20060033214 A | | 4/2006 |
| KR | 100776657 B1 | | 11/2007 |
| WO | 0161377 A2 | | 8/2001 |
| WO | WO-2010005346 A1 | * | 1/2010 ........... B62D 33/067 |

OTHER PUBLICATIONS

Extended European Search Report for European Patent Application No. 16924811.9, dated Apr. 23, 2020, 11 pages.
First Office Action for Chinese Patent Application No. 201680091748.4, dated Sep. 14, 2022, 10 pages.

* cited by examiner

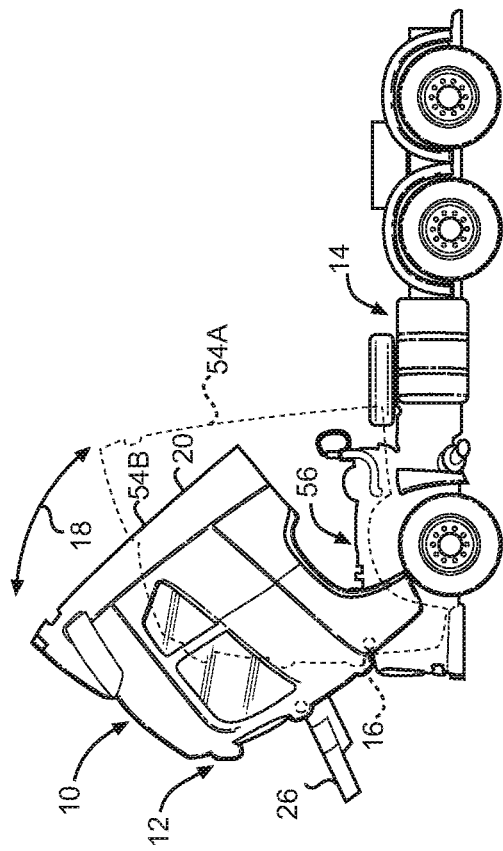
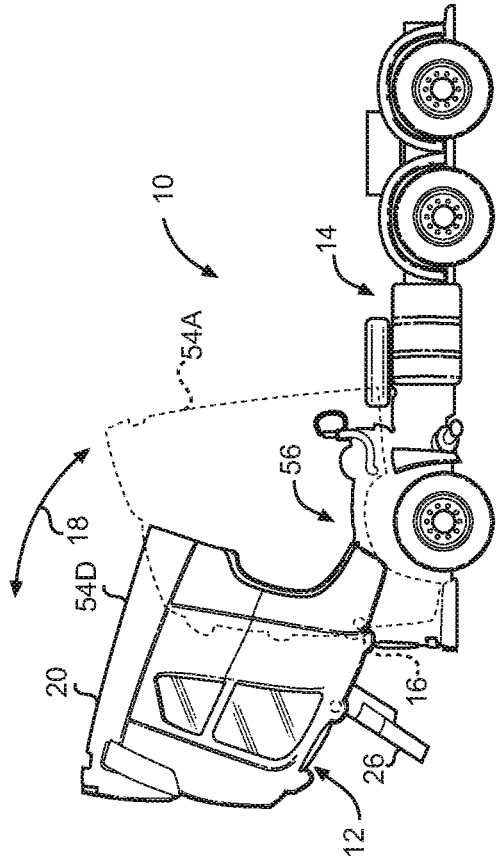
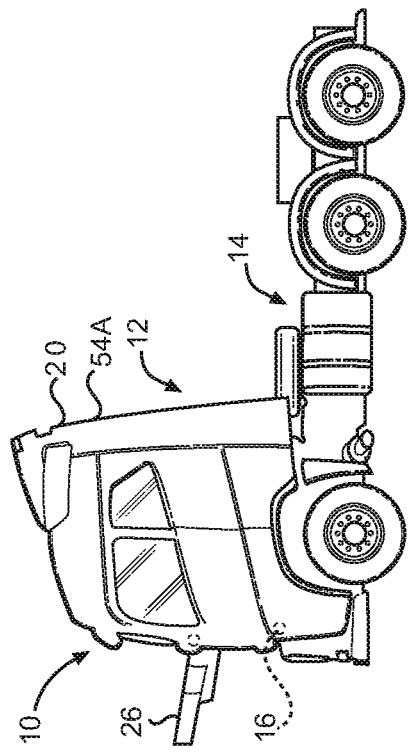
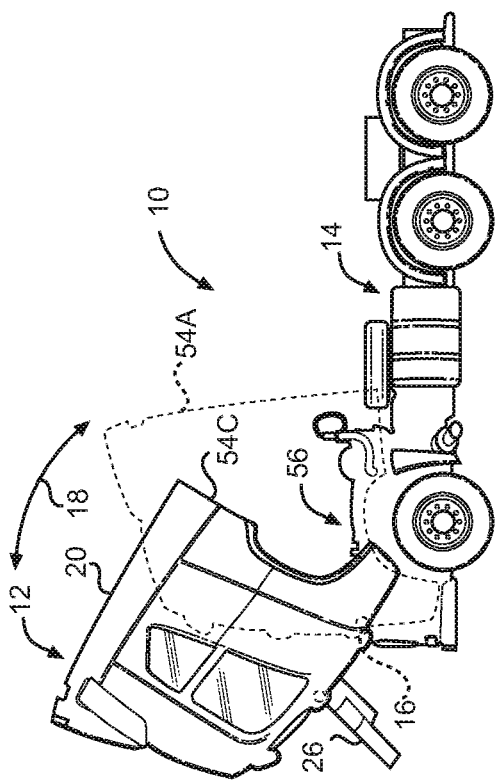
FIG. 2A
FIG. 2B
FIG. 2C
FIG. 2D

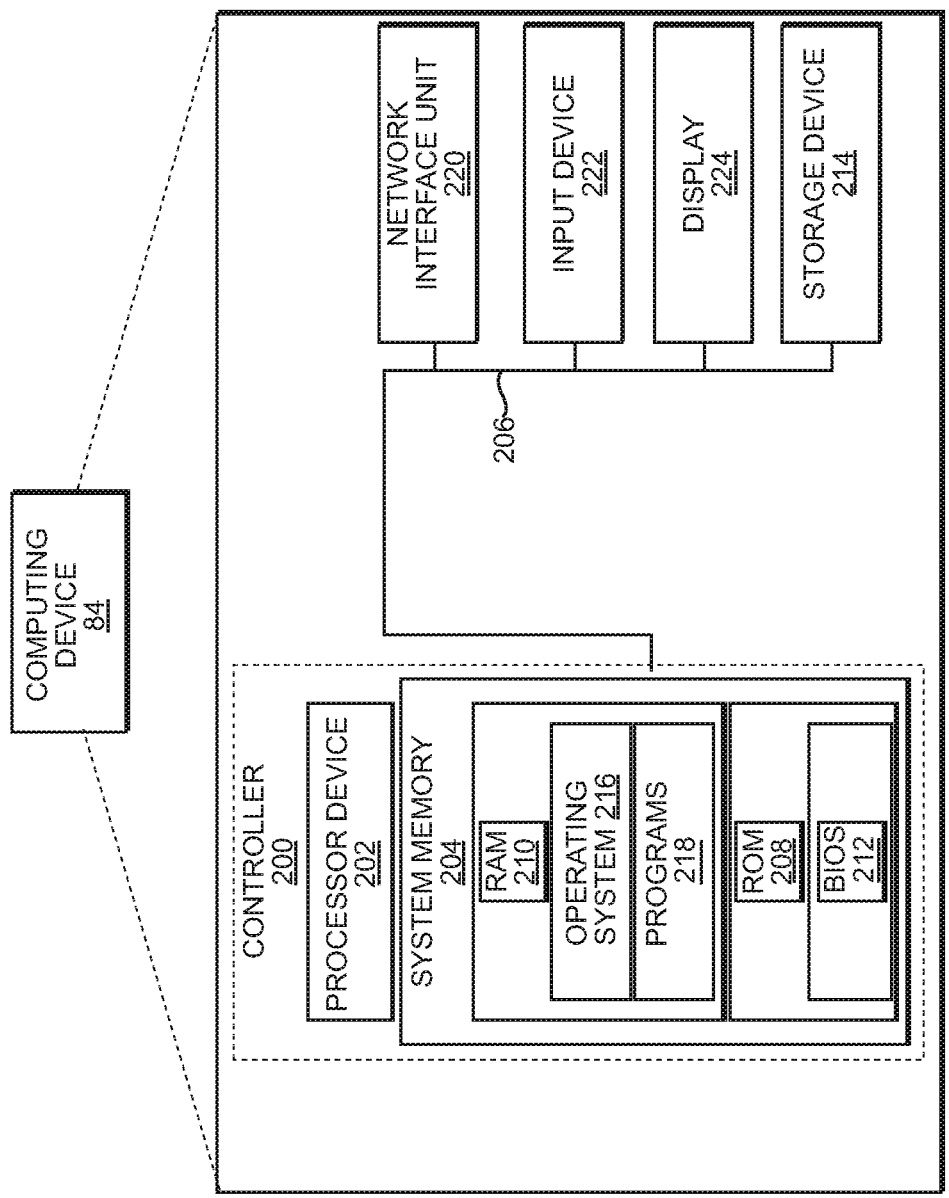

ANTI-COLLISION SYSTEM FOR A TILTABLE TRUCK CAB, AND RELATED DEVICES, COMPONENTS, AND METHODS

This application is a 35 USC 371 national phase filing of International Application No. PCT/BR2016/050346, filed Dec. 23, 2016, the disclosure of which is incorporated herein by reference in its entirety.

FIELD OF THE DISCLOSURE

The disclosure relates generally to an anti-collision system, and more specifically to an anti-collision system for a truck cab that tilts to open the engine compartment, and related devices, components, and methods.

BACKGROUND

Many types of semi-trucks and other commercial vehicles have an engine bay located underneath a cab, or cabin. To service the vehicle, the truck cab may be configured to tilt, that is, rotate with respect to the truck chassis from a closed driving position to an open service position to allow easy access to the engine bay by a mechanic or technician. As the cab moves and rotates, however, portions of the cab move along a path that may be higher, lower, longer, or wider than the dimensions of the cab in the driving position or the service position. Due to the relatively large size of the cab, the chance of the cab colliding with an obstruction, including a person, is increased. In particular, when the cab is in an enclosed space, such as a garage or shop, there is a possibility of the cab colliding with an obstruction, such as a ceiling or wall. Thus, there is a need to prevent the cab from colliding with obstructions during cab rotation.

SUMMARY

The disclosure relates generally to an anti-collision system, and more specifically to an anti-collision system for a truck cab, and related devices, components, and methods. In one embodiment, the system comprises a truck cab defining a truck cab volume and a sensor positioned with respect to the truck cab. The truck cab is rotatable with respect to the truck chassis along a rotation path to define a truck cab rotation volume. The truck cab volume is entirely within the truck cab rotation volume along the entire rotation path, i.e., the truck cab rotation volume encompasses the truck cab volume at every position of the truck cab volume along the rotation path. The sensor has a field of view (FOV) that overlaps a portion of the truck cab rotation volume to detect an obstruction in the FOV that is within the truck cab rotation volume. The sensor may also cause the system to provide an alert or to control rotation of the truck cab in response to detecting the obstruction.

One advantage of this arrangement is that rotation of the truck cab may be performed within a relatively confined space, such as a garage or shop, while avoiding collision with structures, objects, or other obstructions. For example, for many truck cabs, portions of the truck cab volume may have different relative heights with respect to the truck chassis at different points along the rotation path. By detecting obstructions within a truck cab rotation volume that encompasses the truck cab volume at every point along the entire rotation path, it can be automatically determined that a portion of the truck cab will collide with the obstruction before the collision occurs. In response to detecting the obstruction, corrective action can be taken, such as, for example, automatically sounding an alarm and/or stopping or braking the cab rotation motor.

According to one embodiment, an anti-collision system for a truck cab is disclosed. The system comprises a truck cab rotatably coupled to a truck chassis, the truck cab defining a truck cab volume. The truck cab is rotatable with respect to the truck chassis between a first position and a second position along a truck cab rotation path through a truck cab rotation volume. The truck cab volume is entirely within the truck cab rotation volume along the entire truck cab rotation path. The system further comprises a sensor positioned with respect to the truck cab, the sensor having an FOV that overlaps a portion of the truck cab rotation volume to detect an obstruction in the FOV that is within the truck cab rotation volume and, in response to detecting the obstruction, provide a signal to trigger an alert or to control rotation of the truck cab.

According to another embodiment, a method of operating an anti-collision system for a truck cab is disclosed. The method comprises determining, via sensor, a position of an obstruction relative to a truck cab, the truck cab rotatable with respect to a truck chassis along a rotation path, the truck cab defining a truck cab volume, the truck cab volume and the rotation path defining a truck cab rotation volume. The method further comprises automatically determining whether the obstruction is within the truck cab rotation volume.

According to another embodiment, a non-transitory computer readable medium is disclosed. The non-transitory computer readable medium comprises machine readable instructions for directing a processing device to perform a method of operating an anti-collision system for a truck cab. The method comprises determining, via sensor, a position of an obstruction relative to a truck cab, the truck cab rotatable with respect to a truck chassis along a rotation path, the truck cab defining a truck cab volume, the truck cab volume and the rotation path defining a truck cab rotation volume. The method further comprises automatically determining whether the obstruction is within the truck cab rotation volume.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 2A-2D illustrate the truck cab of FIG. 1 at various rotation positions between the closed driving position and the open service position;

FIG. 7 is a schematic diagram of a computing device, such as the computing device of FIG. 5 according to an embodiment.

DETAILED DESCRIPTION

Figure 1:
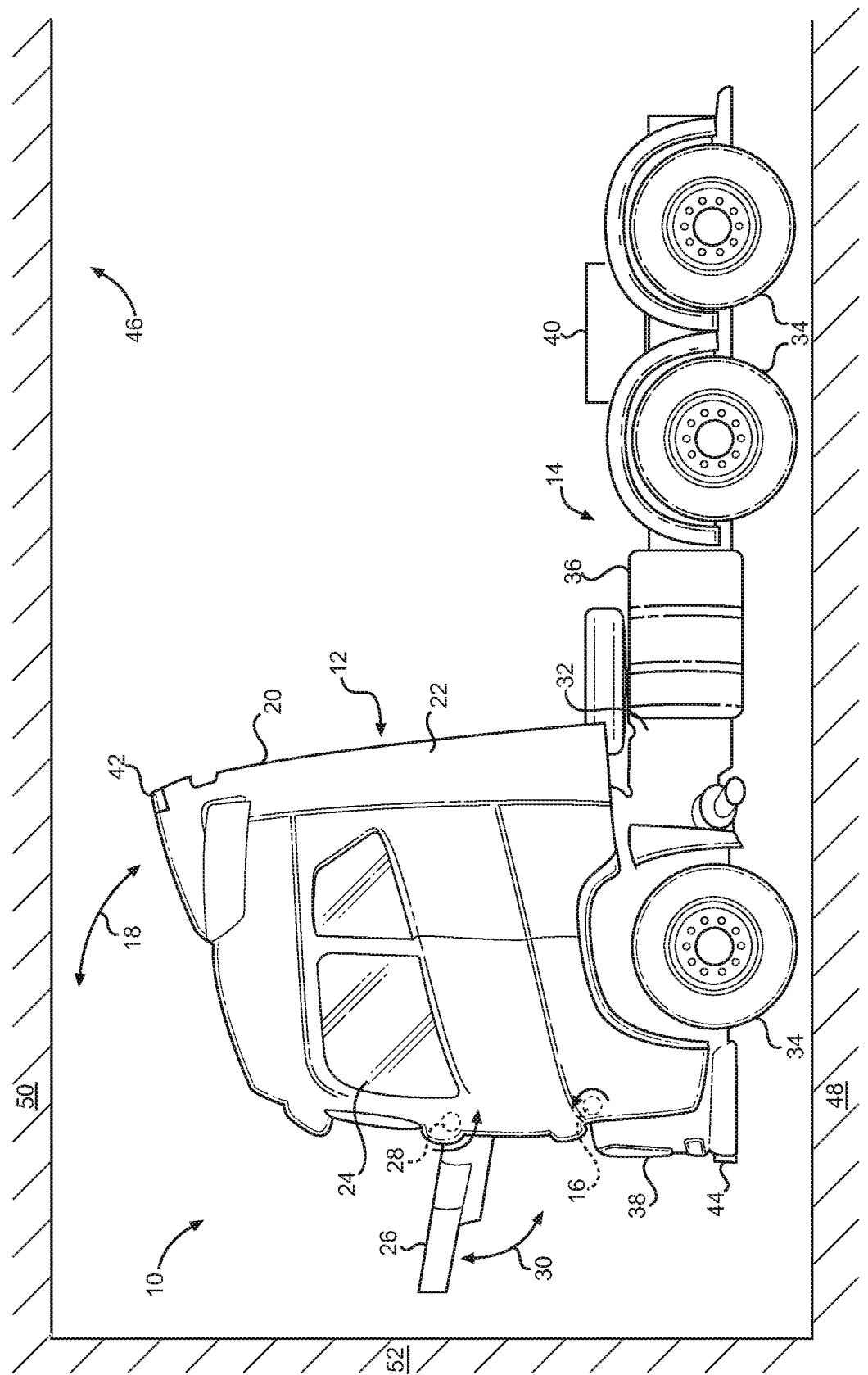
FIG. 1 illustrates an anti-collision system for a truck cab according to an embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements that may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The disclosure relates generally to an anti-collision system, and more specifically to an anti-collision system for a tiltable truck cab, and related devices, components, and methods. In one embodiment, the system comprises a truck cab defining a truck cab volume and a sensor positioned with respect to the truck cab. The truck cab is rotatable with respect to the truck chassis along a rotation path to define a truck cab rotation volume. The truck cab volume is entirely within the truck cab rotation volume along the entire rotation path, i.e., the truck cab rotation volume encompasses the truck cab volume at every position of the truck cab volume along the rotation path. The sensor has a field of view (FOV) that overlaps a portion of the truck cab rotation volume and the sensor is configured to detect an obstruction in the FOV that is within the truck cab rotation volume. The sensor may also cause the system to provide an alert or to control rotation of the truck cab in response to detecting the obstruction.

One advantage of this arrangement is that rotation of the truck cab may be performed within a relatively confined space, such as a garage or shop, while avoiding collision with structures, objects, or other obstructions. For example, for many truck cabs, portions of the truck cab volume may have different relative heights with respect to the truck chassis at different points along the rotation path. By detecting obstructions within a truck cab rotation volume that encompasses the truck cab volume at every point along the entire rotation path, it can be automatically determined that a portion of the truck cab will collide with the obstruction before the collision occurs. In response to detecting the obstruction, corrective action can be taken, such as, for example, automatically sounding an alarm and/or stopping or braking the cab rotation motor.

In this regard, FIG. 1 illustrates an anti-collision system 10 for a truck cab 12 rotatably mounted on a truck chassis 14, according to an embodiment. The truck cab 12 is configured to rotate about a cab rotation axis 16 along an arcuate cab rotation path 18. Rotating the truck cab 12 about the cab rotation axis 16 may also be referred to as tilting the truck cab 12. In this and other embodiments, the truck cab 12 defines a truck cab volume 20, defined as the volume occupied by the components of the truck cab 12, such as, for example, a truck cab body 22 that encloses a cabin interior 24. In this example, the truck cab 12 includes a rotatable hood 26 that is independently rotatable with respect to the truck cab 12 about a hood rotation axis 28 along a hood rotation path 30. In this embodiment, the rotatable hood 26 must be rotated to an open position before the truck cab 12 can be rotated about the cab rotation axis 16, but it should be understood that other configurations are contemplated.

The truck chassis 14 may include a number of components, including a chassis frame 32, a plurality of wheels 34, one or more fuel tanks 36, a plurality of head lights 38, and/or a trailer hitch 40, for example. In general, the truck chassis 14 remains stationary while the truck cab 12 is being rotated about the cab rotation axis 16.

In this embodiment, the truck cab 12 includes a roof sensor 42 coupled to the truck cab body 22, and the truck chassis 14 includes a forward sensor 44 coupled to the chassis frame 32. In this embodiment, the roof sensor 42 is configured to detect an obstruction above the truck cab 12 while the truck cab 12 is being rotated about the cab rotation axis 16, and the forward sensor 44 is configured to detect an obstruction in front of and below the truck cab 12 while the truck cab 12 is being rotated about the cab rotation axis 16. In this example, the truck chassis 14 is parked in a garage bay 46, which may include a floor 48, a ceiling 50, and one or more walls 52 in the relatively confined space of the garage bay 46, however, it may be difficult or impossible to rotate the truck cab 12 about the cab rotation axis 16 without colliding with the one or more walls 52, the ceiling 50, or another obstruction.

In this regard, FIGS. 2A-2D illustrate the truck cab 12 in a number of different rotation positions 54. In FIG. 2A, the truck cab volume 20 is in a closed driving position 54A. The truck cab volume 20 is rotated along the arcuate cab rotation path 18, the truck cab volume 20 passes through respective intermediate rotation positions 54B and 54C, as shown by FIGS. 2B and 2C. FIG. 2D illustrates the truck cab volume 20 in an open service position 54D, with an engine bay 56 of the truck chassis 14 fully accessible to a mechanic or other technician.

Figure 3:
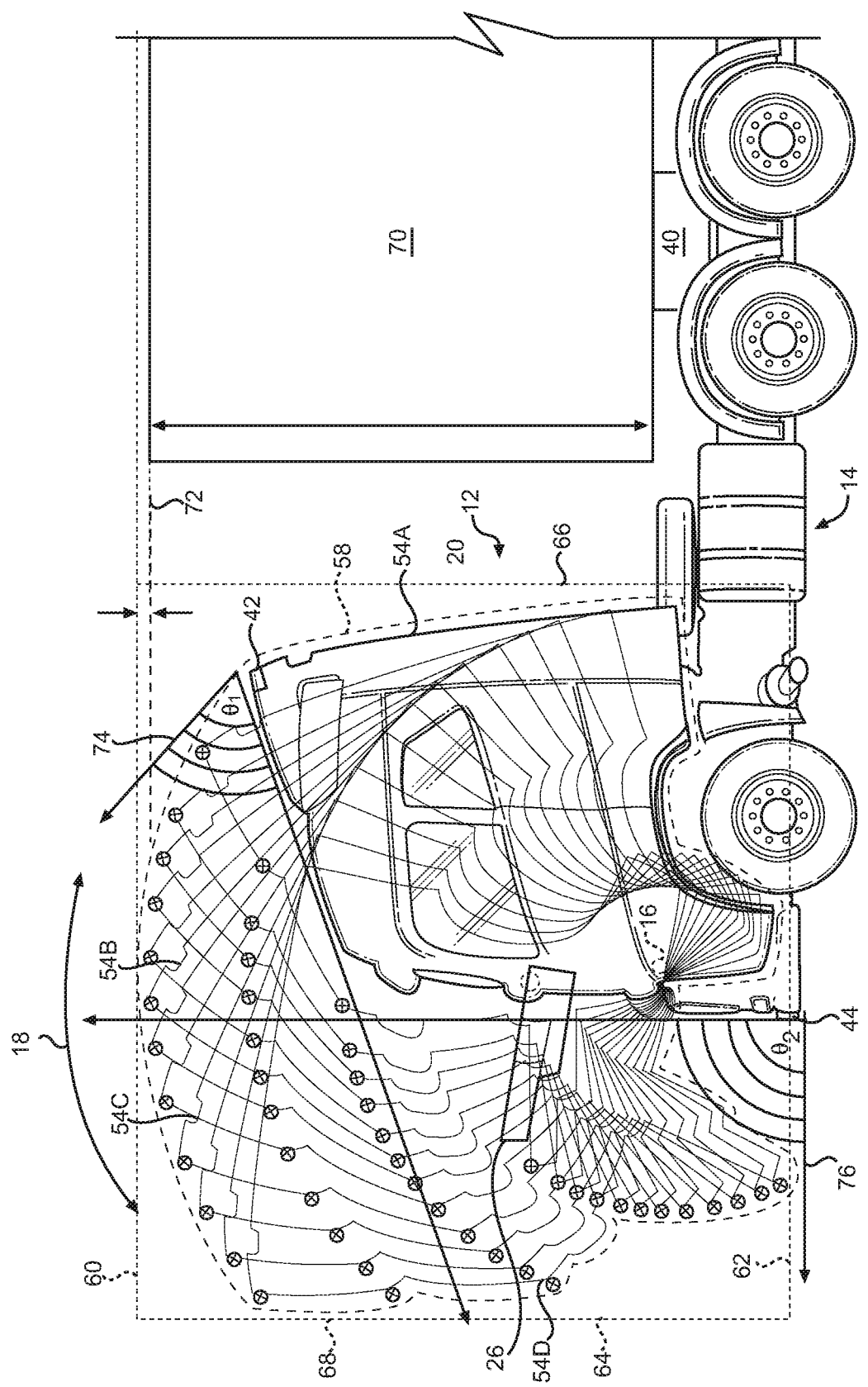
FIG. 3 illustrates a truck cab rotation volume defined by the truck cab volume at every rotation point between the open and closed positions, and the fields of view (FOVs) of a plurality of sensors disposed on the cab to detect an obstruction within the truck cab rotation volume.

As can be seen in FIGS. 2B and 2C, a portion of the truck cab volume 20 may be significantly higher in intermediate rotation positions 54B and 54C than a height of the truck cab volume 20 in either of the closed driving position 54A or the open service position 54D, shown in respective FIGS. 2A and 2D. In this regard, FIG. 3 illustrates a truck cab rotation volume 58 defined by the truck cab volume 20 at every rotation position 54 along the entire arcuate cab rotation path 18. In this embodiment, the truck cab rotation volume 58 is co-extensive with the truck cab volume 20 at every point along the arcuate cab rotation path 18, and defines a maximum height dimension 60 (i.e., an upper height dimension), a minimum height dimension 62 (i.e., a lower height dimension), a maximum forward extension dimension 64 (i.e., a forward length dimension), and a maximum rear extension dimension 66 (i.e., a rear length dimension). In this embodiment, the truck cab rotation volume 58 also includes a maximum right extension dimension and a maximum left extension dimension (i.e., right and left width dimensions, not shown). In this embodiment, for example, the maximum forward extension dimension 64 is defined by a portion of the truck cab 12 when the truck cab 12 is in the open service position 54D, and defines a region in front of the truck cab 12 when the truck cab 12 is in the closed driving position 54A. Similarly, in this embodiment, the minimum height dimension 62 is defined by a portion of the truck cab 12 when the truck cab 12 is in the open service position 54D, and defines a region below the truck cab 12 when the truck cab 12 is in the closed driving position 54A. It should be understood, however, that the truck cab rotation volume 58 may be defined to include further rotation and/or movement of the truck cab 12. For example, in a failure condition, the truck cab 12 may continue rotating through the open service position 54D and strike the floor 48 (not shown). In this case, the minimum height dimension 62 would be coextensive with the floor 48.

In another embodiment, the roof sensor 42, forward sensor 44, or other sensors may be configured to detect obstructions in regions outside the truck cab rotation volume 58 as well. For example, in one type of failure condition, the truck cab 12 may fall forward and break away from the cab rotation axis 16. In a more severe failure condition, the truck cab 12 could also cartwheel forward away from the truck chassis 14 after breaking away from the cab rotation axis 16. To account for the possibility of this type of failure, the forward sensor 44 (and/or other sensors) could be configured to detect a larger region in front of the truck cab 12. This could have the effect of extending the maximum forward extension dimension 64 a predetermined distance beyond the dimensions of the truck cab rotation volume 58 during normal operation. It should also be understood that maximum and minimum dimensions 60-66 could be similarly extended in different directions, as desired.

In some embodiments, these maximum and minimum dimensions 60-66 et al. may define a rectangular prismatic volume 68 that entirely encloses the truck cab rotation volume 58. In this embodiment, the roof sensor 42 and the forward sensor 44 are configured to detect an obstruction within the truck cab rotation volume 58, but it should be understood that the roof sensor 42, the forward sensor 44, and other sensors may be alternatively configured to detect an obstruction within a larger volume such as a rectangular prismatic volume 68. In this alternative embodiment, if no obstruction is detected within the rectangular prismatic volume 68, it follows that there is also no obstruction within and that the truck cab rotation volume 58, and that the truck cab 12 may be rotated about the cab rotation axis 16 while avoiding collision.

In this embodiment, a trailer 70 is coupled to the trailer hitch 40 of the truck chassis 14. In this embodiment, the trailer 70 has a maximum trailer height dimension 72 that is less than the maximum height dimension 60 of the truck cab rotation volume 58. Accordingly, the roof sensor 42 of the truck cab 12 may also be used to ensure that the trailer 70 can pass underneath a structure or object without colliding with the structure or object. Alternatively, in embodiments where the trailer 70 has a maximum trailer height dimension 72 that is greater than the maximum height dimension 60 of a truck cab rotation volume 58, the roof sensor 42 may be configured to detect obstructions below the maximum trailer height dimension 72 as well as below the maximum height dimension 60 of the truck cab rotation volume 58.

In this and other embodiments, the roof sensor 42 may be any type of sensor capable of detecting and/or determining the presence of an obstruction within a roof sensor FOV 74. As used herein, the FOV of a sensor is a volume within which the sensor is capable of detecting an object or obstruction. Examples of sensors suitable for use as the roof sensor 42 include a proximity sensor, a laser sensor, an ultrasonic sensor, and/or an image sensor, such as a camera. One or more sensors, alone or in combination with additional sensors of different types, may detect or determine the presence of an obstruction within a portion of truck cab rotation volume 58 that at least partially overlaps the roof sensor FOV 74, i.e., a portion of the truck cab volume that is coextensive with a portion of the roof sensor FOV 74. In this embodiment, the roof sensor 42 is coupled to the truck cab so that the roof sensor FOV 74 is stationary with respect to the truck cab volume 20 along the entire arcuate truck cab rotation path 18.

Similarly, the forward sensor 44 includes a forward sensor FOV 76, which is also configured to detect and/or determine the presence of an obstruction within a portion of the truck cab rotation volume 58 that at least partially overlaps forward sensor FOV 76. By positioning the roof sensor 42, the forward sensor 44, and/or other sensors, to monitor regions proximate to the maximum dimensions of the truck cab rotation volume 58, the presence of an obstruction can be detected and/or determined before the truck cab 12 is involved in a collision with the obstruction. Although two sensors 42, 44 are described in this embodiment, it should be understood that additional sensors (not shown) may be employed, as needed, so that a larger portion of the truck cab rotation volume 58, or the entire truck cab rotation volume 58, may be monitored for obstructions.

Figure 4:
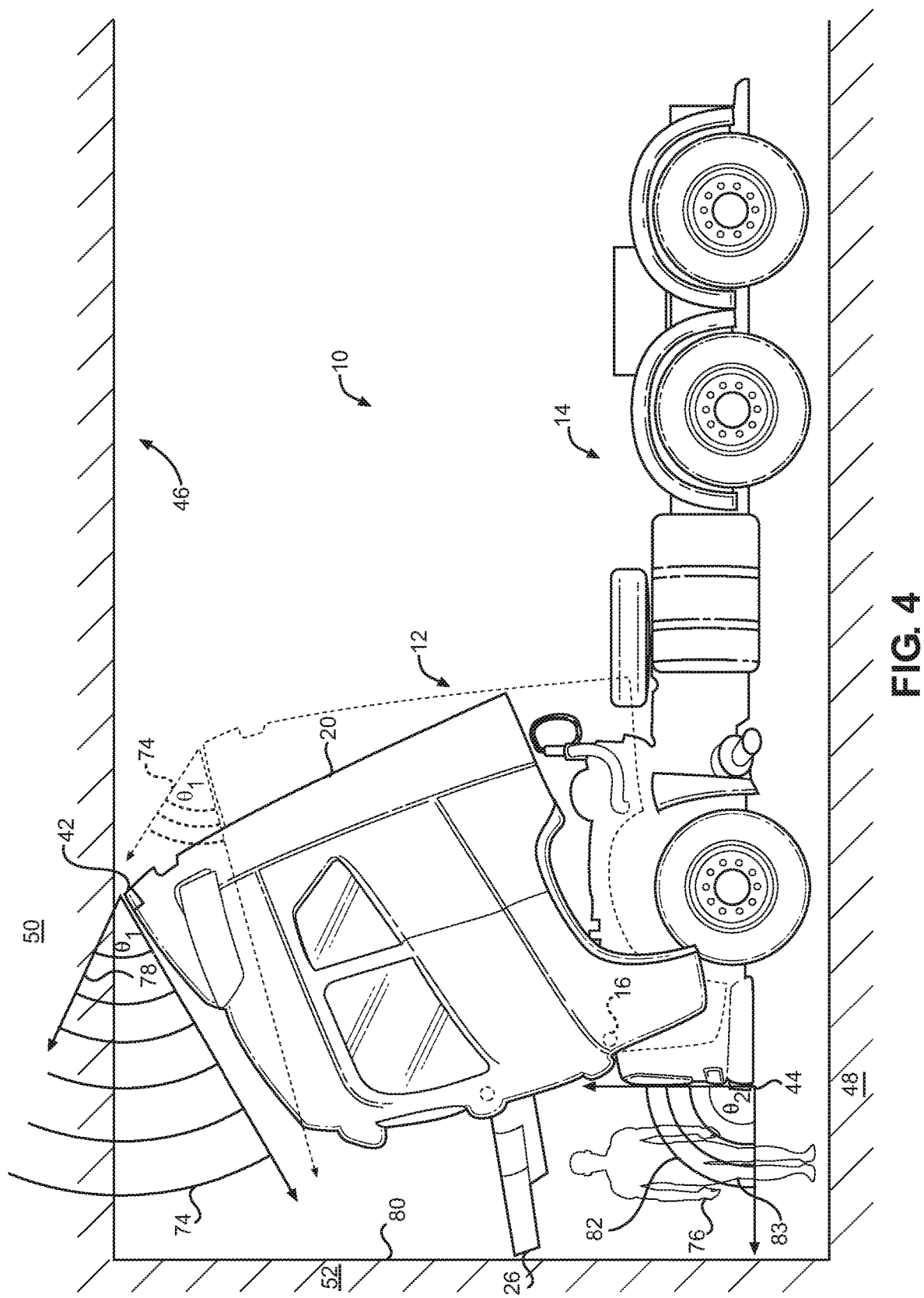
FIG. 4 illustrates operation of the anti-collision system of FIGS. 1-3, with the sensors detecting the presence of a person, a portion of a wall, and a portion of a ceiling within the truck cab rotation volume.

In this regard, FIG. 4 illustrates operation of the anti-collision system 10 of FIGS. 1-3 in an enclosed environment, set in the garage bay 46 in this example. In this example, the ceiling 50 of the garage bay 46 is detected by the roof sensor 42 as an upper obstruction 78 within the roof sensor FOV 74. The forward sensor 44 detects the presence of the wall 52 as a forward obstruction 80 within the forward sensor FOV 76, and also detects the presence of a person 82 as a lower obstruction 83 within the forward sensor FOV 76. For example, if the person 82 moves suddenly into the truck cab rotation volume 58 after the truck cab 12 has begun to rotate, the forward sensor 44 and/or another sensor may detect the presence of the person 82 and take corrective action, which may include one or more of stopping rotation of the truck cab 12, sounding an alarm, and reversing rotation of the truck cab to return the cab to its original position 54A, after which a new attempt at tilting the cab can be performed. The roof sensor FOV 74 and/or forward sensor FOV 76 may be defined by one or more angles and/or sensor ranges with respect to the sensors 42, 44. For example, the roof sensor FOV 74 in this embodiment is at least partially defined by an angle $\theta_1$ in the vertical dimension with respect to the roof sensor 42, and the forward sensor FOV 76 is at least partially defined by an angle $\theta_2$ in the vertical dimension with respect to the forward sensor 44. Each of the sensors 42, 44 may also have a predetermined range at which it is capable of detecting the presence or absence of an obstruction. It should be understood, however, that different sensors may have different ranges and FOVs, as is known in the art. It should also be understood that different types of sensors may have different capabilities, which may be employed in detecting the presence of an object and/or determining whether the obstruction is within the truck cab rotation volume 58. For example, a single ultrasonic sensor might be capable of determining only that an object is within a certain range and FOV of the sensor, while multiple ultrasonic sensors might be able to triangulate a position of the object more accurately. A laser-based sensor might also be able to determine a more exact position for the object in real time. Input from a camera or other image sensor might also be used to create a 3D model of the object in relation to the truck cab rotation volume 58, to determine if the object is within the truck cab rotation volume 58. It should be understood that other methods of using the sensors 42, 44, or other sensors to determine a position of an object relative to the truck cab rotation volume 58 may also be used, as desired.

In response to determining the presence of an upper obstruction 78, forward obstruction 80, lower obstruction 83, or other obstruction, the anti-collision system 10 may perform a number of actions in response to or determining the presence of a new obstruction, such as, for example, halting or preventing rotation of the truck cab 12, or sounding an alarm. The sensors 42, 44 may detect an obstruction in a number of ways. For example, the sensors 42, 44 may be positioned in a way that any object within range of a sensor 42, 44 and within the corresponding sensor FOV 74, 76 would be considered to be an obstruction within the truck cab rotation volume 58. In another example, a computing device may analyze and interpret input received from the sensors 42, 44 to determine if an object detected by the sensors 42, 44 is actually an obstruction within the truck cab rotation volume 58 (or other volume).

Figure 5:
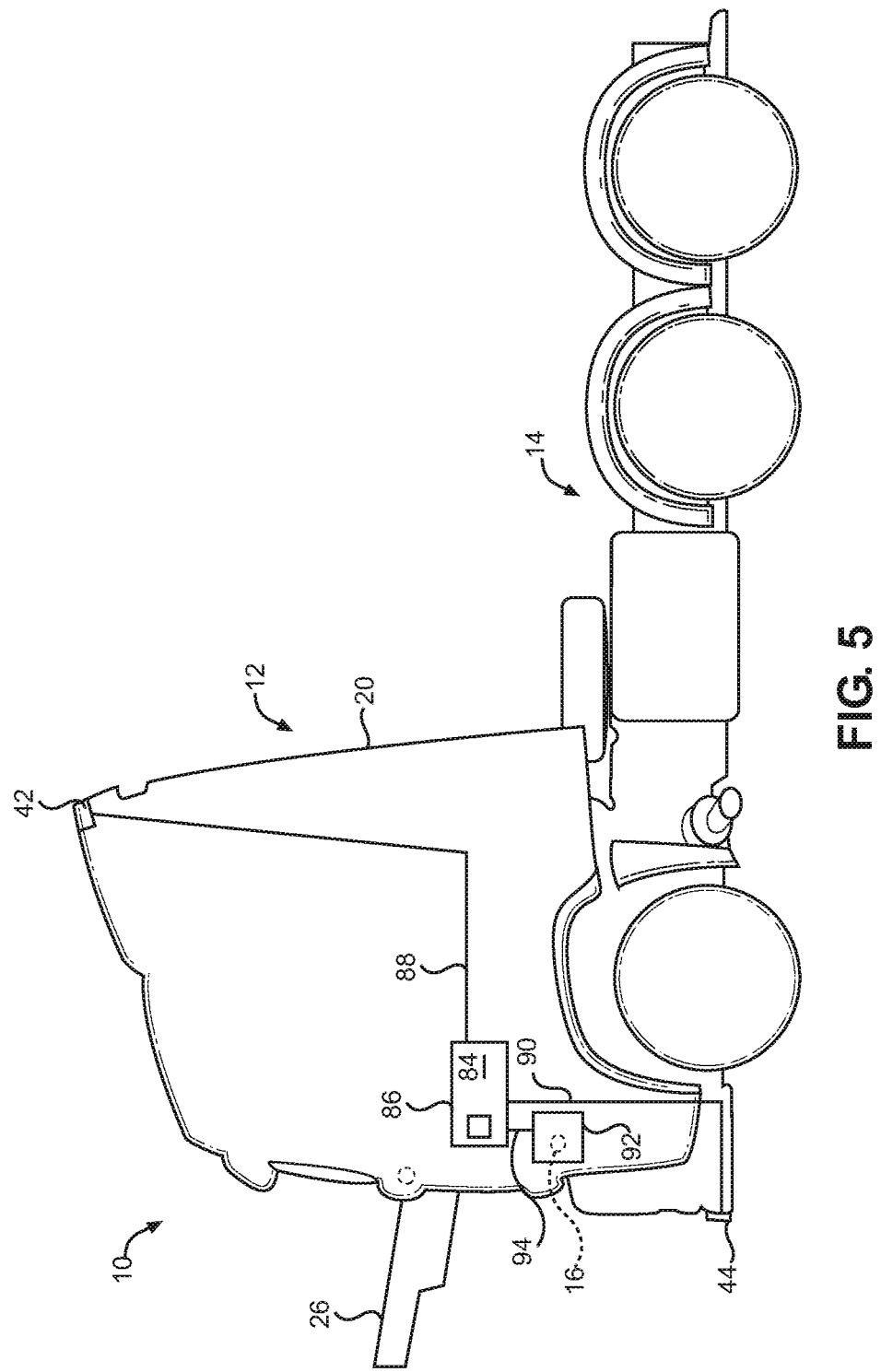
FIG. 5 is a schematic diagram of a portion of an anti-collision system, such as the anti-collision system of FIGS. 1-4, according to an embodiment, including a computing device in communication with the sensors and with the cab rotation motor.

In this regard, FIG. 5 is a schematic diagram of a portion of an anti-collision system, such as the anti-collision system of FIGS. 1-4, according to an embodiment, having a computing device 84, which may include a processing device 86 for communicating with the components of the anti-collision system 10. The computing device 84 in this example communicates with the roof sensor 42 via a roof sensor link 88 and communicates with the forward sensor 44 via a forward sensor link 90. The computing device 84 may also be in communication with a cab rotation motor 92 via a rotation motor link 94, with the cab rotation motor 92 operable to rotate the truck cab 12 about the cab rotation axis 16 in response to input from the computing device 84 and/or manual input. The cab rotation motor 92, which may also be referred to as a tilt motor, may be a hydraulic motor, which may include an electric or manual pump, for example, an electric motor, or another type of motor as is known in the art. The computing device 84 may also instruct the cab rotation motor 92 to stop rotation of the truck cab 12, for example, by stopping the cab rotation motor 92 and/or applying a brake (not shown) to the truck cab 12. In this embodiment, the brake is part of the cab rotation motor 92, but it should be understood that the brake may be part of a different component, or may be a separate device, as well. For example, the brake may be connected to receive a sensor input from the sensor(s) 42, 44 indicating an obstruction within the truck cab rotation volume 58 and to automatically prevent rotation of the truck cab 12 in response to receiving the sensor input.

Figure 6:
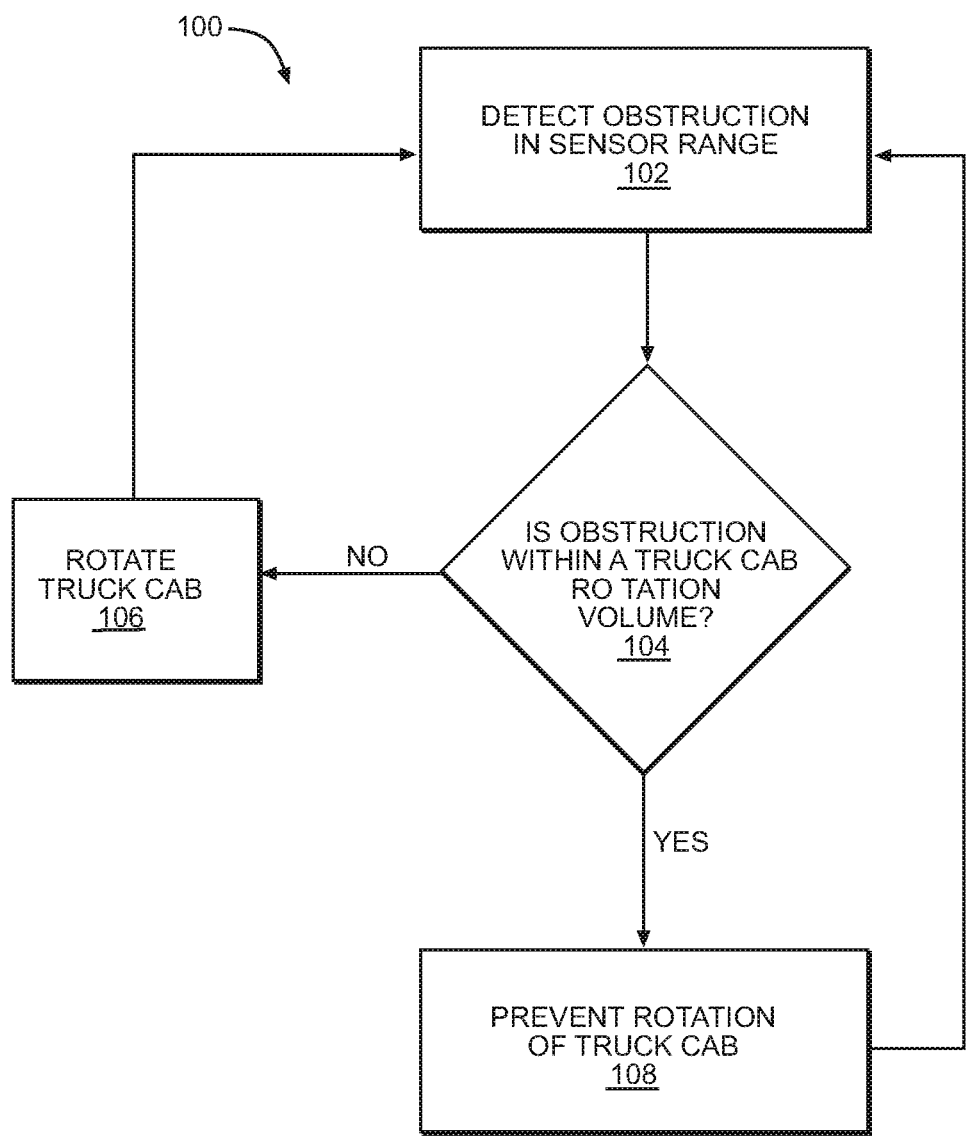
FIG. 6 is a flowchart of a method of operating an anti-collision system, such as the anti-collision system of FIGS. 1-5, according to an embodiment.

The computing device 84 may be configured to perform a method of operating the anti-collision system 10. In this regard, FIG. 6 is a flowchart of a method 100 of operating an anti-collision system, such as the anti-collision system 10 of FIGS. 1-5, according to an embodiment. The method 100 comprises determining a position of an obstruction relative to a rotatable truck cab, such as the truck cab 12 of FIGS. 1-5, for example (Block 102). The method 100 further comprises automatically determining whether the obstruction is within a truck cab rotation volume, such as the truck cab rotation volume 58 of FIGS. 3 and 4 (Block 104). If no obstruction is detected or determined to be present in the truck cab rotation volume, rotation of the truck cab 12 is permitted (Block 106). If an obstruction is detected or determined to be present in the truck cab rotation volume, the truck cab may be prevented from rotating further (Block 108). In this embodiment, the method 100 may be performed as a continuous loop, returning to Block 102.

The components and features herein may be embodied in one or more computing devices, such as the computing device 84 of FIG. 5, or computer-readable media having computer-readable instructions, operable for performing methods, such as method 100 of FIG. 6, disclosed herein. In this regard, FIG. 7 illustrates a more detailed block diagram for the computing device 84 of FIG. 5, according to an embodiment. The computing device 84 is part of the truck cab 12 in this embodiment, but it should be understood that aspects of the computing device 84 described herein may be used in connection with other devices or components of the anti-collision system 10, such as, for example, the truck chassis 14 or a remote computing device (not shown).

In this embodiment, the computing device 84 may comprise any computing or processing device capable of including firmware, hardware, and/or executing software instructions to implement the functionality described herein, and which is capable of being incorporated into components of the anti-collision system 10. In this example, the computing device 84 of FIG. 7 includes a controller 200 having a processor device 202, a system memory 204, and a system bus 206. The system bus 206 provides an interface for system components including, but not limited to, the system memory 204 and the processor device 202. The processor device 202 can be any commercially available or proprietary processor.

The system bus 206 may be any of several types of bus structures that may further interconnect to a memory bus (with or without a memory controller), a peripheral bus, and/or a local bus using any of a variety of commercially available bus architectures. The system memory 204 may include non-volatile memory 208 (e.g., read only memory (ROM), erasable programmable read-only memory (EPROM), electrically erasable programmable read-only memory (EEPROM), etc., and/or volatile memory 210 (e.g., random-access memory (RAM). A basic input/output system (BIOS) 212 may be stored in the non-volatile memory 208 and can include the basic routines that help to transfer the information between the elements within the computing device 84.

The computing device 84 may further include a non-transitory computer-readable storage 214, which may comprise, for example, internal solid state memory, or the like. The computer-readable storage 214 may provide non-volatile storage of the data, the data structures, the computer-executable instructions, and the like. The data structures can store information relating to, for example, broadcast programs, media, or user information. Computer-executable instructions may include pre-defined data processing instructions, or downloaded instructions for data processing at a specified time or interval, for example.

A number of modules can be stored in the computer-readable storage 214 and/or in the volatile memory 210, including an operating system 216 and one or more programs 218, which may implement the functionality described herein in whole or in part.

In addition, the computing device 84 may include additional components, such as a network interface unit 220 or other communications interface, one or more input devices 222, and a display 224 or other visual indicator interface. In this embodiment, the display 224 may be part of an alarm connected to receive an input from the sensor(s) 42, 44 indicating an obstruction within the truck cab rotation volume 58 and automatically provide an alert in response to receiving the input. In this embodiment, the display 224 provides a visual alert, but it should be understood that different numbers and types of alerts may be provided as well. For example, the alarm may also be configured to provide an audio alert in addition to or in place of a visual alert. The visual and/or audio alert may also be provided as part of a different device, or as a standalone alarm connected directly or indirectly to the sensor(s) 42, 44, as desired. The components of the computing device 84 may interact with other components outside of the computing device 84, such as the roof sensor 42, the forward sensor 44, or the cab rotation motor 92, via the network interface unit 220 or other communications interface.

Those skilled in the art will recognize improvements and modifications to the preferred embodiments of the present disclosure. All such improvements and modifications are considered within the scope of the concepts disclosed herein and the claims that follow.

What is claimed is:

1. An anti-collision system for a truck cab, the system comprising:
    a truck cab rotatably coupled to a truck chassis, the truck cab defining a truck cab volume,
    wherein the truck cab is rotatable with respect to the truck chassis between a first position and a second position along a truck cab rotation path through a truck cab rotation volume, wherein the truck cab volume is entirely within the truck cab rotation volume along the entire truck cab rotation path; and
    a roof sensor having a roof sensor field of view (FOV) that overlaps a portion of the truck cab rotation volume to detect, during control of rotation of the truck cab along the truck cab rotation path, an upper obstruction in the roof sensor FOV that is above a roof of the truck cab within the truck cab rotation volume and, in response to detecting the upper obstruction, provide an alert or control the rotation of the truck cab based on the detection of the upper obstruction.

2. The system of claim 1, further comprising a forward sensor having a forward sensor FOV that overlaps a portion of the truck cab rotation volume to detect a forward obstruction or lower obstruction in the forward sensor FOV that is within the truck cab rotation volume and, in response to detecting the forward obstruction or lower obstruction, provide an alert or control rotation of the truck cab.

3. The system of claim 2, wherein at least one of the roof sensor and the forward sensor is coupled to the truck cab proximate to a front of the truck cab, wherein the FOV of the at least one of the roof sensor and the forward sensor is stationary with respect to the truck cab along the entire truck cab rotation path.

4. The system of claim 3, the truck cab further comprising a front hood rotatable between a closed position and an open position, the front hood defining a front hood volume, the truck cab including the front hood volume in the open position.

5. The system of claim 2, wherein each of the roof sensor FOV and the forward sensor FOV that overlaps a different portion of the truck cab rotation volume.

6. The system of claim 1, wherein the truck cab rotation volume has a maximum height dimension with respect to the truck chassis, wherein the portion of the truck cab volume defines the maximum height dimension of the truck cab rotation volume in a third position of the truck cab between the first position and the second position, and
    wherein the FOV of at least one of the roof sensor and the forward sensor is positioned to detect an obstruction below the maximum height dimension of the truck cab rotation volume.

7. The system of claim 1, wherein the truck cab rotation volume has a minimum height dimension with respect to the truck chassis, wherein the portion of the truck cab volume defines the minimum height dimension of the truck cab rotation volume in a third position of the truck cab between the first position and the second position, and wherein the FOV of at least one of the roof sensor and the forward sensor is positioned to detect an obstruction above the minimum height dimension of the truck cab rotation volume.

8. The system of claim 1, wherein the truck cab rotation volume has a minimum height dimension with respect to the truck chassis, wherein the portion of the truck cab volume defines the minimum height dimension of the truck cab rotation volume in the second position, and
wherein the FOV of at least one of the roof sensor and the forward sensor is positioned to detect an obstruction above the minimum height dimension of the truck cab rotation volume.

9. The system of claim 1, wherein the truck cab rotation volume has a maximum forward dimension with respect to the truck chassis, wherein the portion of the truck cab volume defines the maximum forward dimension of the truck cab rotation volume in a third position of the truck cab between the first position and the second position, and
wherein the FOV of at least one of the roof sensor and the forward sensor is positioned to detect an obstruction less than the maximum forward dimension of the truck cab rotation volume.

10. The system of claim 1, wherein the truck cab rotation volume has a maximum forward dimension with respect to the truck chassis, wherein the portion of the truck cab volume defines the maximum forward dimension of the truck cab rotation volume in the second position, and
wherein the FOV of at least one of the roof sensor and the forward sensor is positioned to detect an obstruction less than the maximum forward dimension of the truck cab rotation volume.

11. The system of claim 1, wherein the roof sensor is selected from the group consisting of: a proximity sensor, a laser sensor, an infrared sensor, an ultrasonic sensor, and an image sensor.

12. The system of claim 1, further comprising an alarm connected to receive a sensor input from the roof sensor indicating an obstruction within the truck cab rotation volume and to automatically provide an alert in response to receiving the sensor input.

13. The system of claim 1, further comprising a motor connected to control rotation of the truck cab in response to receiving the sensor input.

14. The system of claim 1, further comprising a brake connected to receive a sensor input from the roof sensor indicating an upper obstruction within the truck cab rotation volume and to automatically prevent rotation of the truck cab in response to receiving the sensor input.

15. The system of claim 1, wherein the roof sensor is mounted at or proximate to a rear edge of the roof of the truck cab.

16. A method of operating an anti-collision system for a truck cab, the method comprising:
determining, via a roof sensor during control of rotation of a truck cab along a truck cab rotation path, a position of an upper obstruction in the roof sensor FOV that is above a roof of the truck cab within a truck cab rotation volume, the truck cab rotatable with respect to a truck chassis along the truck cab rotation path, the truck cab defining a truck cab volume, the truck cab volume and the truck cab rotation path defining the truck cab rotation volume; and
automatically determining whether the obstruction is within the truck cab rotation volume.

17. The method of claim 16, wherein the truck cab rotation volume has a maximum height dimension with respect to the truck chassis, wherein the truck cab volume defines the maximum height dimension at a first position along the truck cab rotation path, and
wherein determining the position of the obstruction relative to the truck cab comprises determining the position of the obstruction below the maximum height dimension of the truck cab rotation volume.

18. The method of claim 16, wherein the truck cab rotation volume has a minimum height dimension with respect to the truck chassis, wherein the truck cab volume defines the minimum height dimension at a first position along the truck cab rotation volume, and
wherein determining the position of the obstruction relative to the truck cab comprises determining the position of the obstruction above the minimum height dimension of the truck cab rotation volume.

19. The method of claim 16, further comprising, responsive to determining that the obstruction is within the truck cab rotation volume, preventing the truck cab from further rotation.

20. The method of claim 16, further comprising, responsive to determining that the obstruction is not within the truck cab rotation volume, allowing the truck cab to continue rotation.

21. A non-transitory computer-readable medium comprising machine-readable instructions for directing a processing device to perform a method of operating an anti-collision system for a truck cab, the method comprising:
determining, via a roof sensor during control of rotation of a truck cab along a truck cab rotation path, a position of an upper obstruction in the roof sensor FOV that is above a roof of the truck cab within a truck cab rotation volume, the truck cab rotatable with respect to a truck chassis along the truck cab rotation path, the truck cab defining a truck cab volume, the truck cab volume, and the truck cab rotation path defining the truck cab rotation volume; and
automatically determining whether the obstruction is within the truck cab rotation volume.

22. The non-transitory computer-readable medium of claim 21, wherein the sensor is coupled to the truck cab proximate to a portion of the truck cab volume,
wherein determining the position of the obstruction relative to the truck cab comprises determining the position of the obstruction relative to the portion of the truck cab volume.

* * * * *